Oct. 20, 1953  C. W. MUSSER  2,656,203
CABLE AND HOUSING CONNECTOR
Filed Oct. 14, 1948

INVENTOR.
C. WALTON MUSSER.
BY
G. J. Kesserich & J. H. Church
ATTORNEYS.

Patented Oct. 20, 1953

2,656,203

UNITED STATES PATENT OFFICE 2,656,203

CABLE AND HOUSING CONNECTOR

Clarence Walton Musser, Philadelphia, Pa.

Application October 14, 1948, Serial No. 54,541

8 Claims. (Cl. 287—76)

(Granted under Title 35, U. S. Code (1952), sec. 266)

This invention relates to improvements in connecting devices, and it has particular reference to a device for quickly connecting or disconnecting cables, ropes, or the like, and housings therefor, employed for transmitting linear or similar motion from one point to another via regular or irregular paths of travel.

Broadly stated, it is the object of this invention to provide means whereby a pair of control pull-cables, or the like, and a corresponding pair of housings therefor may be simultaneously connected or disconnected.

A more specific object is to provide a connecting device which is especially advantageous for use in confined areas which are normally difficult to reach, for example, in and between the walls of airplane fuselages and automobiles, in which manufacture it is very often convenient to install discontinuous cables rather than pulling them through in one piece.

Another object of my invention is to provide a cable and housing connector which will increase the ease with which broken motion transmitting cables may be repaired or replaced.

An additional object of the present invention is to provide a device of the character referred to in which the parts are so constructed and arranged as to effect a strong and safe connection between the cables, ropes, or the like, and housings therefor, which it is desired to connect, and yet to permit quick and easy disconnection whenever same becomes desirable.

A further object is to provide a connecting device of the kind referred to embodying certain structural and functional improvements over devices which heretofore may have been provided for the same or similar purposes.

The prior art has developed many useful and quite varied types of connecting devices for cables, ropes, or the like, the main purposes for which have been to connect two cables or ropes to each other, or to connect a cable or rope to some other object as, for example, a lever. The development of the prior art types of connectors had been stimulated by the need for such devices which could be quickly connected and disconnected, and which would serve to minimize the difficulties of installing motion-transmitting cables, wires, ropes, etc., in and through space-limited and tortuous areas which are difficult and generally impractical of access.

Although the prior art connectors have well served their purpose, their use has been to some degree limited in situations where it is required to connect cables and the like which, for one reason or another, are carried through tubular or other housings therefor. In such cases, it has been necessary to lay bare a portion of the housing in order to utilize the prior art connecting devices to connect, for example, two ends of a cable. Thereafter, the housing has to be replaced or the two housing ends separately reconnected to each other. Quite obviously, the separate steps and devices required to connect or disconnect the cables and housings have been time consuming and expensive, and it should be clear that a device which can effect the connection or disconnection of both cables and housings by a single operation must prove to be a time-saver and, in all likelihood, a money-saver as well. Such has proven to be the case with my present invention which will hereinafter be disclosed.

In order to appreciate the extent of the applications in which my present invention may be employed, it may be well to discuss at this point some typical situation in which both cables and housings are required to be connected or disconnected. Well-known uses for motion-transmitting cables are the case of mechanical brakes in automobiles where motion is transmitted from the brake lever to the wheels, and the choke cable where motion is transmitted from the car's dashboard to the carburetor. As very frequently occurs, such motion-transmitting cables are required to follow rather tortuous paths in order to avoid various obstructions between the two cable ends. This situation is even more pronounced in the case of cables used in airplane construction than it is in automobiles. One way in which the cables can be made to function properly without interference by the obstructing auto or plane parts is to have the cables pass over a series of pulleys. A far more desirable practice, however, has been to mount an appropriate, relatively inflexible housing, between the motion imparting and motion receiving objects, said housing following the required tortuous path but being permanently so mounted, and then installing the flexible cable within the stationary housing.

By such means it has been possible initially to install and subsequently to replace cables which must pass through hard-to-get-at places like airplane fuselages, as it is only necessary to "fish" the flexible cable through the immovably mounted housing. However, a problem has presented itself in cases where it is desired to break the housing at some point along its length, for example, where it becomes necessary to replace airplane motors or parts on the instrument panel, etc. In such instances, it becomes highly desirable to have a readily connectable and disconnectable housing arrangement so that the housing and the cable which it may contain can both be united or disassociated at will. It is in just such constructions that my present invention has proven to be highly invaluable and of considerable advantage over the prior art types of connecting devices.

The foregoing, as well as other objects and advantages of the present invention will become clear from the following detailed disclosure thereof, when taken in conjunction with the accompanying drawings wherein:

Fig. 1 is a plan view showing the two parts of my novel connector together with corresponding cable and housing ends attached thereto, portions of the connecting devices having been broken away to show the internal construction thereof;

Fig. 2 is a longitudinal sectional view taken from line 2—2 of Fig. 1;

Fig. 3 is a view similar to Fig. 1 except that the two parts of my novel connector have been axially moved together into contiguous relationship;

Fig. 4 shows how the cables and corresponding housings of the previous views have been connected and locked together by my novel device, this engagement having been effected by a turning through 90 degrees of one of the connector parts (shown separated in Figs. 1 and 2) in relation to the other;

Fig. 5 is a cross sectional view taken from line 5—5 of Fig. 2;

Fig. 6 is a similar view taken from line 6—6 of Fig. 2;

Fig. 7 is a similar view taken from line 7—7 of Fig. 2;

Fig. 8 is a similar view taken from line 8—8 of Fig. 2;

Fig. 9 is a similar view taken from line 9—9 of Fig. 2;

Fig. 10 is a similar view taken from line 10—10 of Fig. 2;

Fig. 11 is a similar view taken from line 11—11 of Fig. 2;

Fig. 12 is a similar view taken from line 12—12 of Fig. 2;

Fig. 13 is a similar view taken from line 13—13 of Fig. 2;

Fig. 14 is a cross sectional view taken from line 14—14 of Fig. 4;

Fig. 14A is identical with Fig. 14 except for showing how the balls which prevent relative axial motion between the male casing and the cable terminal contained therein have been made ineffective as the cable and terminal therefor are pulled axially toward the left side of the device as illustrated;

Fig. 15 is a cross sectional view taken from line 15—15 of Fig. 4;

Fig. 16 is a similar view taken from line 16—16 of Fig. 4; and

Fig. 17 is a similar view taken from line 17—17 of Fig. 4.

The various parts which comprise the present invention will now be identified with particular reference to Fig. 1, although the reference characters which will be named will be exactly like those having reference to like parts that appear in the remaining illustrations.

Basically, my unique connecting device consists of a hollow cylindrical male member or housing 21 and a mating female member or housing 22. The male member 21 is substantially uniform in overall diameter throughout; but the female member preferably has the expanded portion 50 on its left end (as seen by the reader) narrowing down to a portion 53 of considerably narrower cross section for reasons which will become apparent as the description proceeds.

The male member 21, shown in its position of rest in Fig. 1, has leading in from its right end an L-shaped cam slot 23 (see Figs. 1 to 4 inclusive, 9, 16, 17). Behind this cam slot 23, or to the reader's left, are one or more circular openings 24 each containing a radially slidable detent 26 in the form of a spherical ball. To the rear of the detents 26, or still further to the reader's left, is a circumferential groove 31, the most rearward side of which serves as a ledge or footing for the smaller diameter end of a tapered coil spring 37. Farther to the rear, the hollow cylindrical male member 21 contains an axially extending groove 38 in which a portion of a pin 39 is free to slide only.

The internal opening of hollow male member 21 slidably accommodates a first terminal member 27 to which first cable 28 is secured, as by swaging, welding, brazing, or the like. The slidable first terminal member 27 is secured against rotation relative to the male member 21 by a rivet-like projection 40 anchored into the wall of the male member 21, and having a headed portion 41 projecting into an axial groove 42 in the side of first terminal member 27. The amount of slide permissible to the first terminal member is so limited that detents 26 are prevented at all times from falling inwardly from their positions in the wall of male member 21. Farther to the reader's left there is conveniently provided a stop 25 which projects radially inward from the inner wall of the cylindrical male member 21. In the drawings, this stop 25 is shown as a complete ring; however, such ring construction is not necessary, for a simple fingerlike projection will serve the same purpose. The stop 25 also serves, as will later be made more evident, to limit the distance which the first terminal member 27 and a first cable 28 secured thereto can move rearwardly within the male member 21, and further to limit positioning at the rear end of male member 21 of the first cable housing 29 which serves to enclose cable 28.

Fig. 1 also shows that in the leading or forward end of the first terminal member 27 there is provided in line with the axial portion of the L-shaped cam slot 23, a slot-like opening 32 which interiorly communicates with a much larger cylindrical cavity 33, the slot and cavity forming at their juncture a shoulder 34 (also see Figs. 2, 3, 4, 10, 17). The purpose served by slot 32, cavity 33 and shoulder 34 will be made evident hereinbelow.

Located on the cylindrical outer surface of first terminal member 27 is a shallow circumferential groove 45 so placed that when the forward ends of male member 21 and first terminal member 27 are coplanar, the groove 45 is in alignment with the detents 26 slidably positioned within the wall of male member 21. The cross sectional shape of groove 45 is such as to accommodate the detents 26 and to cause them to slide radially outward under certain conditions as will presently be explained.

Encircling male member 21 is an axially slidable sleeve 35 on whose leading or forward end are diametrically opposed quadrantal locking lugs 36 (see Fig. 8). Just to the rear of the locking lugs and inside the sleeve 35 is a shallow groove 46 (see Figs. 1 to 4 inclusive, 7, 14, 14A) so shaped as to accommodate the detents 26 and also to cause the detents to move radially inward under conditions akin to those pertaining to groove 45 in first terminal member 27. These conditions will be elaborated upon below.

To the rear of groove 46 in sleeve 35, or still further to the reader's left, is an internal groove 47 whose forward side is in contact with the large diameter end of the tapered coil spring 37. This spring 37 constantly urges sliding sleeve 35 toward the forward end (reader's right) of the tubular male member 21. However, the sleeve's total available extent of sliding motion is limited by the length of groove 38 in male member 21; and, as will be evident from further discussion later, the sleeve 35 at all times prevents the detents 26 from falling completely out of their places in male member 21. In addition, in the uncoupled or at rest position of Fig. 1 detents 26 are confined by sleeve 35 in the shallow groove 46 in first terminal member 27, thereby preventing the terminal member from sliding in either direction relative to the male member 21.

A pin 39 (see Figs. 1, 3, 5), anchored in the wall of sliding sleeve 35 and projecting into axial-shaped groove 38 in male member 21, is located farther to the rear of groove 47. Pin 39 is axially slidable in groove 38 but serves to prevent relative rotation between sleeve 35 and male member 21 as well as to limit the axial travel of sleeve 35.

This completes an introduction to the various entities involved in the left hand male member of my novel cable and housing connector. The full significance of these parts will be made more apparent as the description proceeds.

An introduction to the female member 22 will now follow. Referring to Figs. 1–2 which show member 22 in a position of rest it will be seen that female member 22 is, prior to assembly of parts therein, a hollow part. Its left end (as seen by the reader) preferably has the expanded portion 50, which narrows down to a portion 53 of considerably lesser cross section for reasons which will become evident as the description continues. The expanded portion 50 matingly accommodates therein the male member 21. On the rear (or left) face of female member 50 are two diametrically opposed quadrantal locking lugs 51 which later will be seen to co-act with corresponding locking lugs 36 on sliding sleeve 35.

A little to the reader's right of the locking lugs is a rivet-like projection 52 which is anchored into the wall of member 22's expanded portion 50. The head of projection 52 projects radially inward into the open interior of the female member's expanded portion 50. Still farther to the right, anchored in the wall of member 22's narrowed portion 53, is another rivet-like projection 54 which has a head projecting radially inward into the open interior of female member's portion 53 (see Figs. 1, 2, 13).

The hollow narrowed portion 53 of female member 22 slidably accommodates a second terminal member 55 to which a second cable 56 is secured, as by welding, swaging, brazing or the like. The second terminal member 55 is free axially to slide in the female member's portion 53 but is secured against rotation relative thereto by the rivet-like member 54 whose head projects into an axial groove 58 on the surface of the second terminal member. It will be noted that the diameter of the second terminal is such as to permit its sliding within the male member; this is important for when the various parts are connected there must be complete freedom for the second terminal member to slide from within the female to within the male member.

Projecting radially inward from within the narrowed portion 53 of female member 22, near the reader's right, there is conveniently provided a stop 59. In the drawings this stop 59 is shown as a complete ring; however, such ring construction is not necessary for a single finger-like projection will serve the same purpose. The stop 59 serves, as is shown in Figs. 1–2, to prevent the second terminal member 55 from being pushed so far into narrowed portion 53 of female member 22 (i. e. to the reader's right in the drawings) as to make difficult the desired connection thereof with the first terminal member 27. A preferable construction is, as shown in Figs. 1–2, to have the left face of second terminal member 55 coplanar with the bottom (or right face) of female member 22's expanded portion 50. Stop 59 also serves to limit the positioning of second cable housing 57 shown at the reader's right.

Projecting from the left-hand face of second terminal member 55 is an arrowhead member in line with the head of rivet-like projection 52 consisting of a cylindrical stem 60 (see Figs. 1 to 4 inclusive, 12), a shoulder portion 61, a short flattened cylindrical portion 62 and a flattened conical portion 63. Actually the "flats" (see Figs. 1, 3, 11) on each side of the cylindrical portion 62 and on each side of the conical portion 63 are in two parallel planes which are spaced apart a distance slightly less than that across the slot 32 in first terminal member 27. The diameter of cylindrical stem portion 60 is slightly less than the distance across slot 32, the diameter of the short flattened cylindrical portion 62 is slightly less than the diameter of the cylindrical cavity 33 in the first terminal member 27, and the length of the stem portion 60 is slightly greater than the axial length of slot 32.

By means of the just described construction it is possible readily to couple together and uncouple the two terminal members 27 and 55. This is done by aligning the arrowhead with slot 32 (the arrowhead's "flats" 62—63 being held in alignment with the long axis of slot 32), then causing the arrowhead first to enter the slot and then to be rotated approximately 90° so that shoulder portion 61 is brought to bear perpendicularly across the slot 32 (see Fig. 17). Actually, as will be brought out later, this alignment of the arrowhead with slot 32 is effected automatically when male member 21 and female member 22 are coupled together.

By way of orientation, it may be mentioned that the left end of first cable 28 is connected to some remote manually or mechanically operable means (not shown) to provide a pull thereon in the direction from right to left. The right end of second cable 56, on the other hand, is assumed to be attached to some remote object (not shown) on which it is desired to exert a pulling force from right to left, thereby causing a certain result to follow, as for example, movement of a lanyard to fire a gun. The right end of second cable 56 also is assumed to be attached to a means (not shown) which normally tends to pull the cable and its attached second terminal member 55 towards the right against the stop 59 in female member 22's narrowed portion 53.

From the foregoing description of the construction of my novel device, certain of its operative features will be evident. For example, when the male member 21 and female member 22 are properly held in the "at rest" position of Figs. 1-2, the axial portion of the L-shaped cam-slot 23 in male member 21 is in line and on an even plane with the protruding portion of rivet-like projection 52 in the female member 22. At the same time, the slot like opening 32 in first terminal member 27 is in line and on an even plane with the flattened portion 62 on the arrowhead inside female member 22's expanded portion 50. Thus, when male member 21 and female member 22 are axially pushed together, the former enters the latter, projection 52 riding in the track constituting the axial portion of L-shaped slot 23, and the arrowhead member 60—61—62—63 penetrates through slot 32 into the cylindrical cavity 33. At this point, the right-hand face of male member 21 and the corresponding face of first terminal member 27 are coplanar, both members being prevented from movement to the right because they are in flush contact with the shoulder caused by the junction of the female member's expanded portion 50 and narrow portion 53 and also with the left face of second terminal member 55 (see Fig. 3). Members 21 and 27 are also prevented from axial movement relative to each other, being locked together by virtue of the engagement of detents 26 with circumferential groove 45 (see Fig. 6) as enforced by sliding sleeve 35 in its most forward or Fig. 1 position.

It will also be noted that sliding sleeve 35, male member 21 and first terminal member 27 are so secured to each other that all three parts are rotatable only in unison. This is so by virtue of projection 41 extending from member 21 into the axial groove 42 in first terminal member 27, and further by virtue of pin 39 extending from sleeve 35 into the axial groove 38 in member 21. Yet, by sliding sleeve 35 the required distance to the left (Fig. 4 position) shallow groove 46 therein is brought into line with spherical detents 26 so that when first cable 28 is pulled to the left the first terminal member 27 attached thereto likewise is moved to the left until blocked by stop 25, detents 26 simultaneously being nudged radially out of the way into the space provided by circular openings 24 in member 21 and groove 46 in sleeve 35. In similar manner, it will be noted that female member 22 and second terminal member 55 are secured together for joint rotatable movement by virtue of projection 54 in member 22 mating with and riding in the axial groove 58 in member 55. However, when the two terminal members 27 and 55 are coupled together as shown in Fig. 4 by means of the latter's arrowhead member penetrating and locking within the former's cavity 33 (see Fig. 17), the second terminal member 55 is capable of being moved axially to the left in response to a tub on first cable 28.

Having described the salient features of my unique cable and housing connector, the method of coupling the two parts thereof will now be disclosed in detail.

The left-hand or male member 21 is grasped, preferably just to the left of the sliding sleeve 35, in the left hand. Male member 21 must be held in such a way as not to interfere with the movement of sliding sleeve 35. The right-hand or female member 22 is grasped in the right hand. Thus held, the male and female members are brought into axial alignment, the former being inserted as far as possible into the large cavity presented by the expanded portion 50 of the latter.

In accomplishing this union members 21—22 are rotated relative to each other until the rivet-like projection 52 of member 22 is aligned and on an even plane with the axial portion of L-shaped slot 23 on member 21. As above described, when so aligned, the male member 21 will slide into the female member 22 until the right ends of the male member and of the first terminal member 27 carried therein contact the left end of the second terminal member 55 and the bottom or right end of member 22's expanded portion 50 (see Figs. 3-4). At this point projection 52 has reached the end of the axial portion of the L-slot 23, and the arrowhead member extending to the left from second terminal member 55 has entered the cylindrical cavity 33 in first terminal member 27.

In so engaging the male and female members 21—22 the face of locking lugs 51 (see Figs. 1, 2, 3) on the female member contact and push axially to the reader's left the face of the locking lugs 36 on sleeve 35 thereby causing the sleeve to slide its maximum distance to the left along male member 21 to the Fig. 3 position, overcoming the pressure of spring 37. It should be noted that this is merely a face-to-face contact (as in Fig. 3) between the two sets of lugs 51 and 36, and that they are in no way locked together. Also to be noted is the fact that in the Fig. 3 position the sleeve still keeps detents 26 in the circumferential groove 45 on first terminal member 27, thereby preventing any relative axial movement between the male member 21 and the first terminal member.

The male member 21 and the female member 22 are now turned relative to each other a distance of 90° so that rivet-like projection 52 travels along the circumferential portion of the L slot 23 to the blind end thereof (as in Figs. 4, 16). At that point locking lugs 51 and 36 are no longer face to face with each other and spring 37 causes sleeve 35 to move to the right and snap the opposing sets of lugs into locking engagement so that no relative rotation is possible between the sleeve and the female member 22. In addition, the arrowhead's shoulder 61 has, by virtue of the abovementioned 90° rotation been turned across the slot-like opening 32, and the first and second terminal members 27—55, as well as the male and female members 21—22 are therefore coupled. The first and second terminal members are thus secured together so as to permit their axial movement as a unit within and independent of the coupled sleeve 35 and female member 22, although they are non-rotatable except in conjunction with the sleeve, the male and the female members.

After the two sets of locking lugs 51 and 36 snap into locking engagement with each other (as in Figs. 4, 15) the shallow groove 46 in sleeve 35 lies directly opposed to the detents 26 in male member 21 (as shown in Fig. 4). At the same time the first terminal member 27 is thus unlocked from the male member 21 in which it is housed, and thereby becomes free for axial sliding movement in relation thereto. A pull on first cable 28 will cause detents 26 to move radially outward from the shallow groove 45 (see Fig. 14A) in first terminal member 27 and to pass into engagement with the shallow groove 46 in sliding sleeve 35, thereby locking the sleeve against sliding on member 21 and making it impossible accidently to uncouple the parts. Since second terminal member 55 is coupled to first terminal member 27 any pull on first cable 28 will be transmitted in full to second cable 56, and in turn to any mechanism (not shown) attached thereto.

First cable 28 can be pulled until first terminal member 27 abuts stop 25 in male member 21. Upon releasing the pull on first cable 28, by pushing or by means of a spring (not shown) it is possible to return second cable 56 to the right until the second terminal 55 attached thereto abuts its stop 59 in the female member 22.

Assuming now that first cable 28 has been pulled to the left from its position of rest, moving detents 26 into engagement with shallow groove 46, it is obvious that it will be impossible axially to slide sleeve 35. Since the sleeve is thereby locked it is impossible to unlock engagement of locking lugs 51—36 and the coupled members cannot be parted until the first terminal 27 is returned to its position of rest (i. e. the position shown in Figs. 1 to 4).

In order to uncouple the sleeve and female members, and also the two terminal members, the Fig. 4 relationship must exist. In other words, first and second terminal members must be at their positions of rest, at which time shallow groove 45 in first terminal member 27 is in direct opposition to the detents 26 and the sliding sleeve 35 is again free to slide axially on male member 21. The left and right hand units of my unique connector are grasped in the left and right hands respectively. The sleeve 35 is moved with thumb and index finger, for instance, to the reader's left until pin 39 abuts the end of groove 38. The lugs 51 and 36 are thus disengaged from each other and it is then possible to turn the male and female members in relation to each other so that projection 52 rides first circumferentially and then axially out of engagement with L slot 23. Such relative turning at the same time uncouples the first and second terminal members 27 and 55, as the arrowhead is turned so that its shoulder 61 no longer blocks its exit through slot 32. Pulling the left and right hands apart will consequently separate the left-hand coupling units from the right-hand coupling units, thereby effecting a simple quick disconnection of both the cables and the housings therefor.

The illustrative embodiment here disclosed is for explanatory reasons only and it must be understood that many variations will be possible without departing from the spirit and scope of my original, inventive idea.

From the foregoing it will be seen that by my invention I have provided: means whereby a pair of control pull cables, or the like, and a corresponding pair of housings therefor may be simultaneously connected or disconnected; a connecting device which is especially advantageous for use in confined areas which are normally difficult to reach, for example, in and between the walls of airplane fuselages and automobiles, in which manufacture it is very often convenient to install discontinuous cables rather than pulling them through in one piece; a cable and housing connector which will increase the ease with which broken motion transmitting cables may be repaired or replaced; a device of the character referred to in which the parts are so constructed and arranged as to effect a strong and safe connection between the cables, ropes, or the like, and housings therefor, which it is desired to connect, and yet to permit quick and easy disconnection whenever same becomes desirable; and a connecting device of the kind referred to embodying certain functional improvements over devices which heretofore may have been provided for the same or similar purposes.

The invention described in the specification and claims may be manufactured and used by or for the Government for governmental purposes without the payment of any royalty thereon.

I claim:

1. A quick-action device for simultaneously connecting or disconnecting a pair of cables, ropes or the like and a pair of housings therefor; comprising first and second cables; a first terminal secured to said first cable and a second terminal secured to said second cable, said terminals being detachably interengageable with each other; a first terminal housing for said first terminal and a second terminal housing for said second terminal, said terminal housings being detachably interengageable with each other and each providing for limited axial movement by the respective terminals and cables relative to the corresponding terminal housings; first and second cable housings for the first and second cables, respectively, each immovably secured to the corresponding one of said terminal housings; and means which bars axial movement of said first terminal and said first cable relative to said first terminal housing at all times except when said first and second terminals are locked together.

2. A connecting device, comprising detachably interengageable hollow male and female members, a cam-slot on the male member, a pin projecting from the female member and adapted to engage said cam-slot so that upon rotating the said members in opposite directions they are effectively locked against axial movement independent of each other, a sleeve slidably mounted on said male member and having an end adapted axially to align and interfit with an end of said female member, means yieldably cooperating with said sleeve to maintain it in interfitted position with said female member so as effectively to lock the interfitted parts against rotative movement independent of each other, detachably interengageable terminal members respectively mounted for limited axially slidable movement within said male and female members and adapted to become lockingly engaged when said male and female members are rotatively locked together and to become disengaged when said male and female members are unlocked from each other, a pair of housings for cables or the like each secured to a corresponding one of the male and female members, respectively, and a pair of cables each extending through one of said housings and each having one end secured to a corresponding one of said terminal members whereby axial movement imparted to one of said cables is thereby imparted to the other of said cables without moving said housings, the extent of cable movement being limited only by the distance which the terminal members are enabled axially to slide within the said male and female members.

3. The device of claim 2 including means for preventing relative rotation of but not interfering with the relative axial movements of the sleeve and of the male member, means for preventing relative rotation of but not interfering with the relative axial movements of the male member and the terminal member mounted therewithin, and means for preventing relative rotation of but not interfering with the relative axial movements of the female member and the terminal member mounted therewithin, whereby the terminal members are positively placed in alignment with each other so as to become lockingly interengageable simultaneously with the locking engagement of the male and female members.

4. The device of claim 2 including means which prevents the male and female members from becoming detached when the locked terminal members have been moved axially with respect thereto.

5. The device of claim 1 in which the means that bars axial movement of said first terminal and said first cable relative to said first terminal housing except when said first and second terminals are locked together additionally acts to bar said axial movement except when said first and second terminal housings also are locked together.

6. A quick-action device for facilitating the connection or disconnection of a pair of cables, ropes or the like jointly with a corresponding pair of housings therefor, comprising: first and second cables; a first cable housing for said first cable and a second cable housing for said second cable, said cable housings being detachably interengageable with each other and each providing for limited axial movement by the respective cables relative to the corresponding cable housings; said second cable being associated with its corresponding housing in proper receptive position for detachably interengaging said first cable, said first and second cables being interengaged upon interengagement of said housings; limit means for halting the axial movement of said first cable relative to its housing; and release means for effecting release of said limit means upon interengagement of said first and second cable housings; whereby said limit means bars axial movement of said first cable relative to its corresponding housing at all times except when said first and second cables, and said first and second cable housings, respectively, are interengaged.

7. A detachable coupling for connecting a pair of cables, ropes, or the like, jointly with a corresponding pair of housings therefor comprising, in combination: a first assembly and a second assembly, each of said assemblies comprising a housing and a cable axially movable therein, each of said housings having a portion for detachably interengaging the similar portion of the other of said housings, each of said cables having a proximal and a distal extremity, each of said proximal extremities comprising a portion for detachably interengaging the similar portion of the other of said cables as said housing portions enter into interengagement; retaining means associated with each of said assemblies for limiting axial movement of each said cable in the direction of its distal extremity relative to its corresponding housing so as to assure the interengagement of the proximal extremities of said cables as the housings enter into interengagement with each other; and release means for releasing one of said retaining means when said first and second assemblies are interengaged, whereby relative axial movement of said interengaged cables with respect to said interengaged housings is made possible.

8. A detachable coupling for facilitating both the connection and disconnection of a pair of cables, ropes or the like jointly with a corresponding pair of housings therefor comprising, in combination: a first assembly and a second assembly, each of said assemblies comprising a housing and a cable axially movable therein, each of said housings having a portion for detachably interengaging the similar portion of the other of said housings, each of said cables having a proximal and a distal extremity, each of said proximal extremities comprising a portion for detachably interengaging the similar portion of the other of said cables as said housing portions enter into interengagement; retaining means associated with each of said assemblies for limiting axial movement of each said cable in the direction of its distal extremity relative to its corresponding housing so as to assure the interengagement of the proximal extremities of said cables as the housings enter into interengagement with each other, each of said retaining means additionally limiting axial movement of each said housing relative to and in the direction of the distal extremity of its associated cable; and release means for releasing at least one of said retaining means when said first and second assemblies are interengaged, whereby relative axial movement of said interengaged cables with respect to said interengaged housings is made possible.

CLARENCE WALTON MUSSER.

References Cited in the file of this patent

UNITED STATES PATENTS

| Number | Name | Date |
|---|---|---|
| 428,046 | Hanagin | May 13, 1890 |
| 2,093,037 | Douglas | Sept. 14, 1937 |
| 2,093,403 | Sertillange | Sept. 21, 1937 |
| 2,182,896 | Hixon | Dec. 12, 1939 |
| 2,448,548 | Purdy | Sept. 7, 1948 |

FOREIGN PATENTS

| Number | Country | Date |
|---|---|---|
| 4,598 | Great Britain | of 1909 |